May 13, 1941.　　M. KERSTEN ET AL　　2,241,912
ARRANGEMENT FOR COIL WINDING WITH MAGNETIZABLE CORES
Filed May 4, 1938　　2 Sheets-Sheet 1

Inventors
Martin Kersten and
Adolf Weis
by Knight Bros.
Attorneys

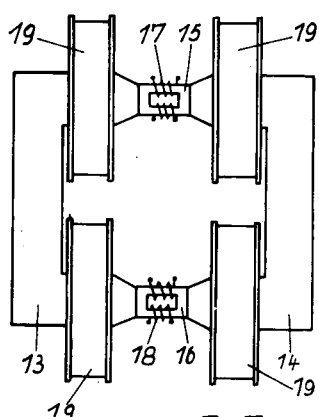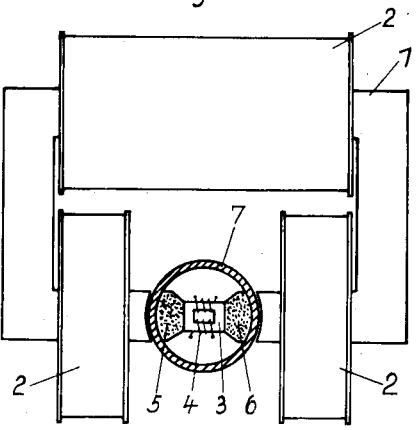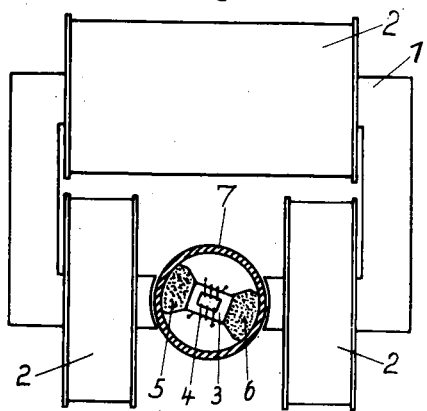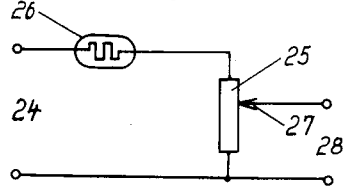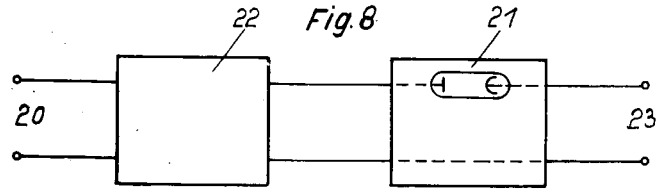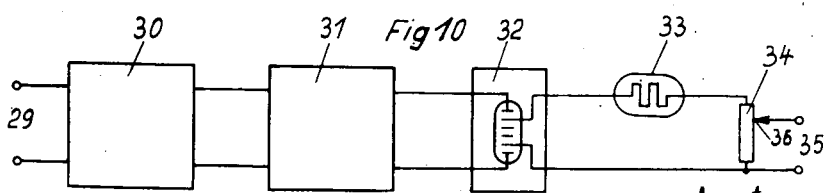

Patented May 13, 1941

2,241,912

UNITED STATES PATENT OFFICE 2,241,912

ARRANGEMENT FOR COIL WINDING WITH MAGNETIZABLE CORES

Martin Kersten, Berlin-Siemensstadt, and Adolf Weis, Berlin-Charlottenburg, Germany, assignors to Siemens & Halske, Aktiengesellschaft, Siemensstadt, near Berlin, Germany, a corporation of Germany Application May 4, 1938, Serial No. 206,000
In Germany May 4, 1937

5 Claims. (Cl. 171—242)

The invention relates to arrangements for the regulation of the inductance of coils with magnetisable cores, similar to composition cores, by varying the exciting or biasing magnetization of the cores. By composition cores are meant magnetic cores consisting of comminuted or powdermagnetic material and an insulating binder, the entire composition being of a character well known in the art. Magnetic systems of this nature are frequently used for remote control of high frequency circuits, in particular for remote tuning of radio receivers, by varying the inductance of the high frequency coil, arranged in an oscillatory circuit, by means of altering the current required for magnetic biasing. The cores with the coil windings thereon are arranged in these devices between poles of yoke-like magnet cores, carrying the exciting or magnetising winding. The cores of the exciting system in this case consist in general of solid iron or laminated iron. In most cases it is required to construct a system of this nature very compact, partly for mere constructional reasons to save space, and partly for magnetic reasons for the purpose of keeping the magnetic path for the exciting field short, since the magnetic efficiency of the arrangement can be materially improved thereby. With arrangements of this kind leakage fields may still form even with closed high frequency iron cores i. e. the cores carrying the high frequency windings, which fields on the one hand may partly pass through the adjacent pole pieces of the exciting core, and, on the other hand, may lead to coupling of the high frequency winding with the magnetising windings of the exciting system. Both phenomena are disadvantageous and result in a considerable increase of the losses in the high frequency coils. The increase of the losses caused by coupling the high frequency winding with the magnetising windings will be readily understood from the foregoing. Increase of losses by the passing of the leakage fields over the pole pieces of the exciting core is due to the fact, that eddy currents are produced in the core by these fields. The invention has for its object to eliminate these drawbacks. According to the invention the present problem is solved by specially forming and dimensioning the high frequency system and the exciting system, or by a special mutual coordination of both systems so that these leakage fields may not go beyond the pole pieces of the exciting core by which the exciting flux is transferred to the core carrying the high frequency windings.

The invention is illustrated in the accompanying drawings, in which—

Figure 5 represents a modification in which the several high frequency cores are connected in series in the flux of the exciting core, each in a separate gap of that core.

Figures 6 and 7 show in two operating positions one of several possible means for regulating the inductance value of the high frequency coil, and Figures 8 to 10 diagrammatically represent several means for controlling the voltage supplied to the field exciting coils of Figures 1 to 7.

Figure 1:
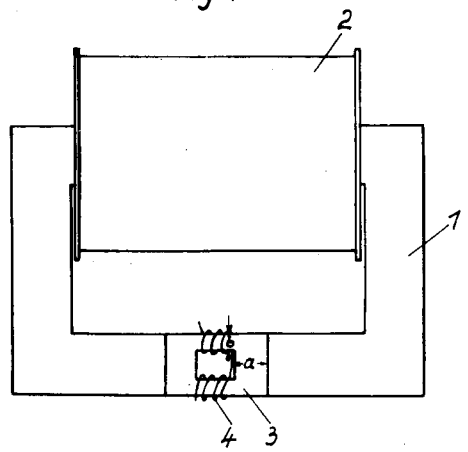
Figure 1 represents semi-diagrammatically a magnetically biased magnet yoke having a high frequency core according to the invention inserted between the yoke pole pieces.
Figure 2:
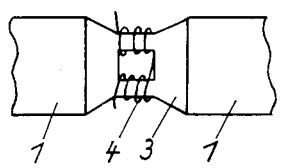
Figure 2 represents a modified form of the high frequency core of Figure 1.

Reduction of the developing leakage fields of the high frequency winding may be attained in accordance with the invention by special shaping of the high frequency iron core, resulting in a concentration of the high frequency field upon this core. For this purpose the yoke portions of the high frequency core, located adjacent to the poles of the exciting system, may be given a larger volume in the direction of the exciting flux, than would be provided by the width of the shanks of the core. In addition to such broadening in the direction of the exciting direct current magnetic field flux the yokes of the high frequency core may further be given an increase in cross section at right angles to such direction. The result of such measure is, that the induction in the yokes of the core is materially diminished and that in consequence thereof the tendency for leakage is considerably reduced at the portions of the high frequency core adjacent to the poles of the exciting system. This is shown in Figure 1 in which 1 indicates the core of the exciting system, 2 the exciting winding arranged thereon, fed with direct current of varying intensity, 3 the high frequency iron core on which is arranged the high frequency winding 4. As shown in the drawings, the width $a$ of the yokes of the high frequency iron core, located adjacent to the pole pieces of the exciting system, is made larger in the direction of the magnetic direct current field flux than the width b of the limbs, on which the high frequency winding is arranged. It may be advisable in this case to shape the cross section of the yokes in such a manner, that it gradually increases in the direction from the shanks of the high frequency system toward the poles of the exciting system. This is shown in Figure 2, in which the cross section of the yokes of the high frequency core 3 gradually increases toward the pole pieces 1 of the exciting system. The yokes may have in this case vertically a trapezoid cross section as shown in the drawings, apart from the cross section in the plane of the illustration or parallel thereto, respectively.

Figure 3:
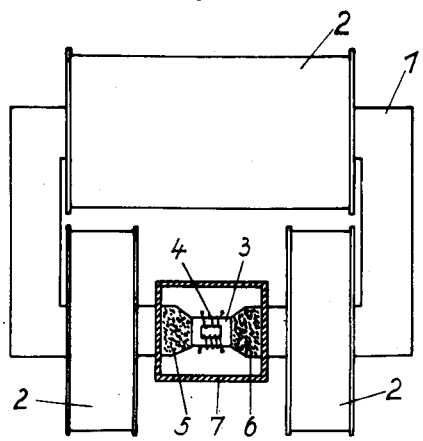
Figure 3 represents a modification of the exciting core pole pieces between which the high frequency core is located.

The unfavourable effect between the alternating field of the high frequency core and the exciting core may, however, be also eliminated by special shaping and dimensioning of the exciting system proper. Since the unfavourable effect is determined in particular by the parts of the exciting system, lying directly adjacent to the high frequency core, i. e., the pole pieces of the exciting system, it is possible in accordance with the invention to construct them in a special manner. The construction of these pole pieces in conformity with the invention consists materially in the selection of a material different from that which is used for the remainder of the flux path of the exciting system. In this connection electrical subdivision of the exciting core against eddy currents in the immediate neighbourhood of the coil core can be materially increased as compared with the more distant parts of the exciting core. This electrical subdivision may be attained, for instance, by constructing the exciting core 1 of fine iron wires, insulated from one another in conventional manner and running parallel to the magnetic flux, or by using composition core material of suitable character for the pole pieces. This material should preferably have a higher permeability than that of which the high frequency coil core is constructed. The proper selection of permeability makes it possible to lessen the unavoidable reduction of the exciting flux in the vicinity of the points where the flux passes from the exciting core to the high frequency core. The extensive insulation of the magnetisable particles in the composition core material of the pole pieces prevents the formation of large eddy currents, so that the otherwise occurring losses are practically avoided. An arrangement of this kind may be still further improved by using pole pieces having tapering ends, so that their large ends fit to the ends of the coil cores. Such an arrangement is shown in Figure 3 in which similar elements are designated with the same reference characters as in Figures 1 and 2. The pole pieces or the ends, respectively, of the exciting core are shown at 5 and 6, and are made in this case, as stated before, of a finer subdivided magnetic material than the exciting core 1, for instance of any suitable kind of composition core material. At the same time these pole pieces taper toward the high frequency core 3. For the purpose of screening the high frequency winding arrangement, it is enclosed in a conventional metal can 7.

Such a construction assists the increase of the magnetic resistance of the exciting core at the ends of the pole pieces. It ensures in particular gradual transition from the highly permeable material of the exciting core to the material of the coil core having less permeability. From this results the further advantage, that the exciting field will pass principally through the coil core without much leakage, so that the magnetic efficiency of such arrangement is very good. Such gradual transition between the exciting system and the high frequency core may also be attained by constructing the pole pieces 5, 6 so that different portions have different magnetic density, whereby the portions having the least density are located at the points where they meet the core 3 of the tuning coil. The pole pieces may for this purpose be punched out of superposed layers having varying magnetisable material content, or they may be composed of layers of varying iron percentage. The average ring core permeability of the composition core material for the pole pieces amounts to about 30–120, depending on the operating frequencies to be used.

As regards the leakage fields causing the coupling of the high frequency windings with the exciting windings, this influence may be advantageously met in accordance with the invention by a screening arrangement between the high frequency winding and the exciting magnet system. Since the screening for the reduction of the losses should preferably be arranged at a safe distance from the high frequency winding, it may be advantageous to also include the pole pieces of the exciting system within the metallic screen as shown at 7 in Figure 3. In consequence thereof the leakage field emanating from the high frequency winding is prevented by the screening from extending to the core parts of the exciting system not consisting of composition core material and this materially avoids in this part the formation of eddy currents, which would impair the efficiency of the high frequency coils. The principal effect is, however, that by means of the screening any coupling between one or more high frequency windings and the exciting windings of the magnetisation system will be eliminated.

This special constructional embodiment of the high frequency arrangement within a screen such as 7 may be further utilised in other respects. The screen may be used as part of an adjusting device, by which the induction coils to be regulated may be adjusted simultaneously, if desired with the pole pieces of the exciting system, by twisting or sliding them with respect to the axis of this magnet system. At this place will then occur a change of the magnetic resistance of the exciting flux path and this will permit of fine adjustment of the inductance of the tuning coil. Such fine adjustment may be advantageous, for instance, when providing a high frequency apparatus with such coils for obtaining ganging of the inductance characteristics of several tuning coils.

The use of the invention is not restricted to arrangements, in which only a high frequency winding is tunable by an exciting system. Rather the invention includes a magnetization system which may serve simultaneously for the regulation of several high frequency coils. In a construction of this kind the exciting magnetization for the cores of all high frequency windings is variable by the same values, so that with the same construction of the high frequency coils the same change of inductance is attained in all cases, permitting of exact ganging of the inductances. In this case the individual high frequency systems may be arranged in several individual air gaps of the exciting magnetization system or in one air gap. In the former case, however, the magnetic resistance to the exciting flux, as compared with a system having but one air gap, is increased. Although the magnetic efficiency of such system is therefore not very high, such a construction ensures the advantage, that the various high frequency coils may be arranged widely apart from one another and that no coupling can occur between them. If the high frequency windings are all arranged in the same air gap of the magnetization system, they should be parallel connected, as it were, in the magnetization flux. The magnetic resistance in the exciting circuit is then reduced to a minimum. In this case it becomes necessary, however, for preventing mutual coupling between the high frequency coils and the circuits connected therewith, to screen the coils not only with respect to the magnetization system, but also mutually from one another.

Figure 4:
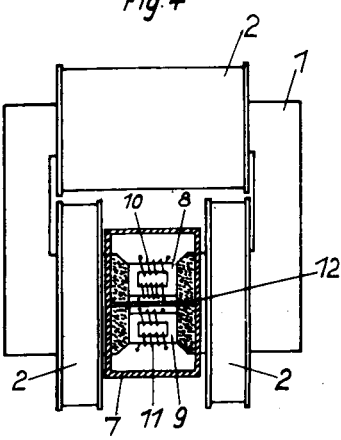
Figure 4 represents a modification in which several high frequency cores are located magnetically in parallel in one gap of the exciting core.

In Figure 4 is shown the arrangement of several high frequency cores in parallel in one gap. The cores of the high frequency windings are denoted by 8 and 9, their windings by 10 and 11. The high frequency systems are here, as in Figure 3, enclosed in a screening container, together with the pole pieces of the exciting system. But a partition 12 is provided within this container for mutually screening the two high frequency systems 8 and 9.

In Figure 5 is shown the aforementioned series arrangement of several high frequency cores in the same exciting flux but each core in a separate gap of the exciting core.

The exciting core in this case consists of two component parts 13 and 14, forming two gaps, between the poles of which respectively the high frequency iron cores 15 and 16 with their windings 17 and 18 are located. The several sections of the exciting winding are denoted with 19.

In such multiple systems as shown in Figures 4 and 5 and including several simultaneously variable tuning circuits it is preferable, in view of the never entirely avoidable non-uniformity of the coil windings and their magnetizable cores, to provide means for adjusting each individual coil inductance to the same minimum, maximum and intermediate values with respect to the other coil inductances. For the purpose of obtaining this effect the cross section of the coil cores may be variable at one or more places, for instance, by magnetizable adjustable bodies. The magnetic resistance to the magnetization flux may be made adjustable, in the different forms described hereinbefore, for instance, by partly swinging the coil core including the exciting pole pieces out of line with the magnetic axis of the exciting system.

Such an arrangement is shown in Figures 6 and 7. I to 4 again designate the exciting core, the exciting winding, the high frequency iron core and the high frequency winding, respectively, as in Figures 1 and 3. 5 and 6 indicate the pole pieces of the exciting system made of special material as described, and 7 represents the screen, enclosing the high frequency system together with the specially shaped pole pieces 5 and 6. This high frequency system is rotatable around an axis at right angles to the plane of the drawing, so that it can be rotated from the position shown in Figure 6, for instance, to a position as shown in Figure 7 for the aforedescribed equalizing purpose.

For perfect operation of such arrangements of high frequency windings with adjustments of the inductance value, by the several means mentioned, it may be preferable, for the purpose of avoiding variations of the exciting flux, for instance, due to network fluctuations, heating of the exciting system or the inserted regulating resistances, and other control elements, to insert in the exciting circuit devices for keeping the current or the voltage, respectively, constant. Thus, in accordance with the invention, there may be arranged in series with the exciting system switching elements for keeping the current constant, which may consist, for instance, of hot conductors, ferro hydrogen resistances and the like. For accurately maintaining the operating voltages may be used magnetic voltage regulators, which compensate widely fluctuating voltages of the supply source, or glow voltage regulators, which are preferably connected at the side of the direct current voltage and which operate very accurately.

Arrangements for such devices are shown as examples in Figures 8 to 10. In Figure 8, 20 represents the connection for the magnetization system to the power supply. This particular modification refers to an alternating current power supply, requiring a rectifier 21 connected to the feed lines for obtaining the direct current voltage for the excitation. The never avoidable fluctuations of the voltage of the system are compensated by a conventional magnetic regulator 22 for the supply voltage, arranged in front of the rectifier 21. At 23 the connection of the magnetization system is preferably effected by way of a current regulator, for instance of the kind shown in Figure 9.

At 24 is shown in this figure a direct current voltage source, which may, for instance, be a rectifier such as 21 in Figure 8, or a battery, in circuit with a ferro hydrogen resistance 26 of well-known construction, and a regulating resistance 25. Resistance 26, by its well-known action, keeps the current constant, so that always a constant voltage is applied to the resistance 25. In consequence thereof a given voltage applied by means of the variable tap 27 to a magnetization system such as shown in Figures 1 to 7, connected at 28, always remains constant.

In Figure 10 is shown a power supply connection for the magnetization systems, which for keeping the voltage, applicable to the magnetization system, constant within wide limits is composed of several regulating devices. The alternating power supply is at 29 and feeds by way of a conventional magnetic voltage regulator 30 a rectifier 31. In this case the rectifier output is supplied to a glow path potential divider 32, serving for keeping the direct current potentials derived from it constant within wide limits in the case of fluctuations of the voltages applied. A ferro hydrogen resistance 33, inserted in the circuit derived from the potential divider, serves for the compensation of possibly occurring current fluctuations which may be caused by heating of the potentiometer 34 located in that circuit or of the exciting winding of the magnetization system, which is connected at 35 and whose current or voltage, respectively, is adjusted by means of the variable contact 36 of potentiometer 34.

We claim:

1. In an inductive system containing a first magnetizable core forming an independently closed magnetic circuit, and a high frequency winding on said core, an exciter system composed of a second magnetizable core having poles of comparatively larger cross section than said first core and between which poles said first core is disposed, so as to pass the exciter flux through said first core, a second winding on said exciter core and means for varying the exciter flux through said first core, the magnetic material portions adjacent to the exciter core poles and said first core being subdivided against eddy currents to a greater extent than the remainder of the exciter core, and the cross section of said material being essentially larger than that of the remainder of said first core, for preventing magnetic stray fluxes from the high-frequency core from entering said first core flux path, means for screening said first core from said exciter core, said magnetic material portions being included in said screening means, said screening means being movably disposed between the exciter core poles to vary the exciter flux through said first core.

2. In an inductive system containing a first magnetizable core forming an independently closed magnetic circuit, and a high frequency winding on said first core, and an exciter system composed of a second magnetizable core having poles of comparatively larger cross section than said first core and between which poles said first core is disposed, so as to pass the exciter flux through said first core, an exciter winding on said exciter core and means for varying the exciter flux through said first core, the magnetic material between said first core and the exciter poles gradually tapering in cross section from the poles toward said first core for preventing magnetic stray fluxes from said first core from entering the exciter core flux path, a screen surrounding said first core and said tapering material portions for externally screening said elements, said screen and said surrounded elements being rotatably disposed between said poles to vary the exciter flux through said first core.

3. A variable inductance device comprising a high-frequency inductance coil, an exciting coil for controlling the inductance of said high-frequency coil, and a magnetic core system having two magnetically interlinked core portions, one of said core portions accommodating said exciting winding and having a relatively large cross section and a pole gap, said other core portion having a smaller cross section and consisting of a fully closed magnetic circuit of finely divided material for accommodating said high-frequency coil, said latter core portion being arranged to bridge said pole gap and being movable relative to said former core portion in order to adjust the preexcitation of said latter core portion caused by said former portion, and screening means enclosing said adjustable core portion and said high-frequency coil to prevent the high-frequency flux from passing through said core portion of said exciting coil.

4. A variable inductance device comprising a high-frequency inductance coil, an exciting coil for controlling the inductance of said high-frequency coil, and a magnetic core system having two magnetically interlinked core portions, one of said core portions accommodating said exciting winding and having a relatively large cross section and a pole gap, said other core portion having a smaller cross section and consisting of a fully closed magnetic circuit of finely divided material for accommodating said high-frequency coil, said latter core portion being arranged to bridge said pole gap and being movable relative to said former core portion in order to adjust its preexcitation, the cross section of said adjustable core portion being larger at its ends near said former core portion than in between.

5. A variable inductance device comprising a high-frequency inductance coil, an exciting coil for controlling the inductance of said high-frequency coil, and a magnetic core system having two magnetically interlinked core portions, one of said core portions accommodating said exciting winding and having a relatively large cross section and a pole gap, said other core portion having a smaller cross section and consisting of a fully closed magnetic circuit of finely divided material for accommodating said high-frequency coil, said latter core portion being arranged to bridge said pole gap and being movable relative to said former core portion in order to adjust its preexcitation.

MARTIN KERSTEN.
ADOLF WEIS.